(12) United States Patent
Parmentier

(10) Patent No.: US 11,203,007 B2
(45) Date of Patent: Dec. 21, 2021

(54) METHOD OF CHROMATOGRAPHY ON A POROUS PACKING PRODUCED BY A DRAWING PROCESS

(71) Applicant: Francois Parmentier, Saint Martin d'Heres (FR)

(72) Inventor: Francois Parmentier, Saint Martin d'Heres (FR)

( * ) Notice: Subject to any disclaimer, the term of this patent is extended or adjusted under 35 U.S.C. 154(b) by 0 days.

(21) Appl. No.: 15/764,299

(22) PCT Filed: Sep. 27, 2016

(86) PCT No.: PCT/FR2016/052447
§ 371 (c)(1),
(2) Date: Aug. 24, 2018

(87) PCT Pub. No.: WO2017/055729
PCT Pub. Date: Apr. 6, 2017

(65) Prior Publication Data
US 2019/0009251 A1    Jan. 10, 2019

(30) Foreign Application Priority Data
Sep. 29, 2015  (FR) ..................... 1559198

(51) Int. Cl.
*B01J 20/28*  (2006.01)
*B01J 20/283*  (2006.01)
(Continued)

(52) U.S. Cl.
CPC ........ *B01J 20/28045* (2013.01); *B01D 15/08* (2013.01); *B01D 15/40* (2013.01);
(Continued)

(58) Field of Classification Search
CPC .. B01J 20/28045; B01J 20/283; B01J 20/285; B01J 20/305; B01J 20/3064; B01J 20/30;
(Continued)

(56) References Cited

U.S. PATENT DOCUMENTS

| 4,007,138 A | 2/1977 | Kanig |
| 5,234,594 A * | 8/1993 | Tonucci ............. B01D 39/2003 |
| | | 210/500.26 |

(Continued)

FOREIGN PATENT DOCUMENTS

| WO | 2011/114017 A2 | 9/2011 |
| WO | 2016/050789 A1 | 4/2016 |
| WO | 2016/050797 A1 | 4/2016 |

OTHER PUBLICATIONS

Preliminary Research Report and Written Opinion received for French Application No. 1559198, dated Aug. 2, 2016, 8 pages (1 page of French Translation Cover Sheet and 7 page of original document).

(Continued)

*Primary Examiner* — Ryan B Huang
(74) *Attorney, Agent, or Firm* — Womble Bond Dickinson (US) LLP

(57) ABSTRACT

The invention relates to a method of chromatography wherein a gaseous, liquid or supercritical fluid mobile phase, which contains substances to be separated, flows through a porous packing which comprises a plurality of capillary channels which extend in the direction of flow of said mobile phase, said packing being manufactured by a method wherein:
a bundle of elementary fibres is assembled, said fibres comprising a core made of a solid, liquid or gaseous material, and a shell made of a drawable material,
said bundle is drawn in order to reduce the diameter of said fibres,
a porous matrix is formed around the core of the drawn fibres, the formation of said porous matrix comprising a transformation of the shell material,
where said porous matrix comprises at least one population of connected pores interconnecting the chan-
(Continued)

nels, where the thickness of the porous matrix between two adjacent channels is less than the diameter of the channels, preferably less than half the diameter of the channels, where necessary the core material is removed so as to leave free channels in the porous matrix.

34 Claims, 5 Drawing Sheets

(51) Int. Cl.
      *B01J 20/285*     (2006.01)
      *B01J 20/30*      (2006.01)
      *B01D 15/40*      (2006.01)
      *B01D 15/08*      (2006.01)
      *B01D 53/04*      (2006.01)

(52) U.S. Cl.
    CPC ..... *B01D 53/0407* (2013.01); *B01D 53/0423* (2013.01); *B01J 20/283* (2013.01); *B01J 20/285* (2013.01); *B01J 20/305* (2013.01)

(58) Field of Classification Search
    CPC ....... B01J 20/00; B01J 20/3078; B01D 15/08; B01D 15/40; B01D 53/0407; B01D 53/0423

See application file for complete search history.

(56) References Cited

U.S. PATENT DOCUMENTS

| | | | | |
|---|---|---|---|---|
| 2008/0026188 | A1* | 1/2008 | D'urso | G02B 6/02314 |
| | | | | 428/188 |
| 2013/0075317 | A1* | 3/2013 | Parmentier | B01J 20/305 |
| | | | | 210/198.2 |
| 2015/0125882 | A1* | 5/2015 | Bornheimer | B01F 5/0691 |
| | | | | 435/7.24 |

OTHER PUBLICATIONS

International Search Report and Written Opinion received for PCT Patent Application No. PCT/FR2016/052447, dated Jan. 5, 2017, 25 pages (11 pages of English Translation and 14 pages of Original Document).

International Preliminary Reporton Patentability received for PCT Patent Application No. PCT/FR2016/052447, dated Apr. 12, 2018, 20 pages (10 pages of English Translation and 10 pages of Original Document).

* cited by examiner

METHOD OF CHROMATOGRAPHY ON A POROUS PACKING PRODUCED BY A DRAWING PROCESS

FIELD OF THE INVENTION

The present invention relates to a chromatography method carried out on a porous multiple-capillary material, whose manufacture incorporates drawing a bundle of fibres.

BACKGROUND TO THE INVENTION

Close contact between two phases such as a gas and a liquid in order to promote chemical or physical interaction of these phases is an important operation in chemical engineering.

Multi-capillary packings have been proposed in order to create highly efficient chromatographic columns which allow rapid analyses to be performed. An example of such packings can be found described, for example, in patent application WO 2011/114017.

It is known that the theoretical plate height for such a packing is of the order of the diameter of the channels.

The need to manufacture packings whose channel diameter is a small as possible emerges in order to achieve the highest possible efficiencies.

U.S. Pat. No. 5,234,594 by Tonucci et al. describes a method for the manufacture of filters by drawing glass rods formed of a core which is soluble in acid sheathed in an inert and insoluble envelope. The method for creating the channels consists of dissolving the core in an aqueous solution of an acid by causing the reaction to progress from the open end of the channels. This can only produce packings of very short length. Moreover, the side walls of the channels, obtained from Corning 0120 glass, a lead glass, are continuous and not porous, as the photographs and manufacturing method show.

Such a filter is therefore not suitable for a chromatographic method application.

Document US 2008/0026188 describes a method for manufacturing an object by drawing, with the aim of forming channels within a porous glass matrix. This object is, however, neither designed nor suitable for chromatography.

BRIEF DESCRIPTION OF THE INVENTION

One aim of the invention is to design a chromatographic method which implements a packing which exhibits improved efficiency.

The invention is a chromatographic method wherein a gaseous, liquid or supercritical fluid mobile phase, which contains substances to be separated, flows through a porous packing which comprises a plurality of capillary channels which extend in the direction of flow of said mobile phase,
said packing being manufactured by a process wherein:
a bundle of elementary fibres is assembled, said fibres comprising a core made of a solid, liquid or gaseous material, and a shell made of a drawable material,
said bundle is drawn in order to reduce the diameter of said fibres,
a porous matrix is formed around the core of the drawn fibres, the formation of said porous matrix comprising a transformation of the shell material,
where necessary the core material is removed so as to leave free channels in the porous matrix.

In a particularly advantageous manner, said porous matrix exhibits at least one population of connected pores interconnecting the channels, where the pores have a diameter greater than twice the molecular diameter of the substances to be separated. The term "connected" means that the pores are linked to each other.

In a particularly advantageous manner, the thickness of the porous matrix between two adjacent channels is less than twice the diameter of the channels.

In a particularly advantageous manner, the mean diameter of the channels is less than 30 µm.

A preferred way to carry out the method comprises combining the characteristics stated above.

According to one embodiment, the mobile phase is a gas phase and the population of connected pores interconnecting the channels has a mean diameter greater than the mean free path of the species to be separated in the mobile phase.

Advantageously, the thickness of the porous matrix between two adjacent channels is smaller than the diameter of the channels, and yet more preferably less than half the diameter of the channels.

Advantageously, the bundle is drawn after it has been inserted into a tube made of a non-porous material which can be drawn simultaneously with said bundle and which defines a wall of the packing, where said wall remains non-porous after the transformation of the shell material.

According to one embodiment the core material is a metal.

Alternatively the core material is a gas such as air or nitrogen.

According to one method of implementing the invention the shell material is borosilicate glass and the transformation which leads to the porous matrix being obtained comprises spinodal decomposition.

Advantageously the packing has a pore volume greater than 30% of its total volume, preferably greater than 40% of its total volume and yet more preferably greater than 50% of its total measured volume, excluding the volume of the channels.

The porous matrix may advantageously comprise, within its porous volume, a third solid body.

Another aim of the invention relates to a method for manufacturing a multi-capillary packing for implementing a chromatographic method, comprising at least the following steps:
supply of at least one fibre comprising a shell made of a material that can be drawn when exposed to heat and a core made of a solid material which fills said shell,
insertion of the fibre fed continuously into a drawing device in which:
a region of the fibre is heated so as to make the shell material drawable in this region and to fuse the core material in this region, where said core material remains solid in the portion of the fibre upstream of said region, and
the portion of the fibre downstream of said region is drawn whilst said portion is cooled to below the fusion temperature of the core material,
removal of the core material and transformation of the shell material so as to form capillary channels extending through a porous matrix which comprises at least one population of connected pores interconnecting the channels, where the thickness of the porous matrix between two adjacent channels is less than the diameter of the channels, preferably less than half the diameter of the channels.

Advantageously, before or after the drawing step, a plurality of fibres is assembled, each comprising a shell made of a material that can be drawn when exposed to heat and a core made of solid material which fills said shell, so as to form a bundle.

Advantageously the bundle of fibres is inserted into a tube which exhibits a non-porous wall.

BRIEF DESCRIPTION OF DRAWINGS

Other characteristics and advantages of the invention will emerge from the detailed description which follows, with reference to the appended drawings, in which.

DETAILED DESCRIPTION OF THE INVENTION

Figure 1:
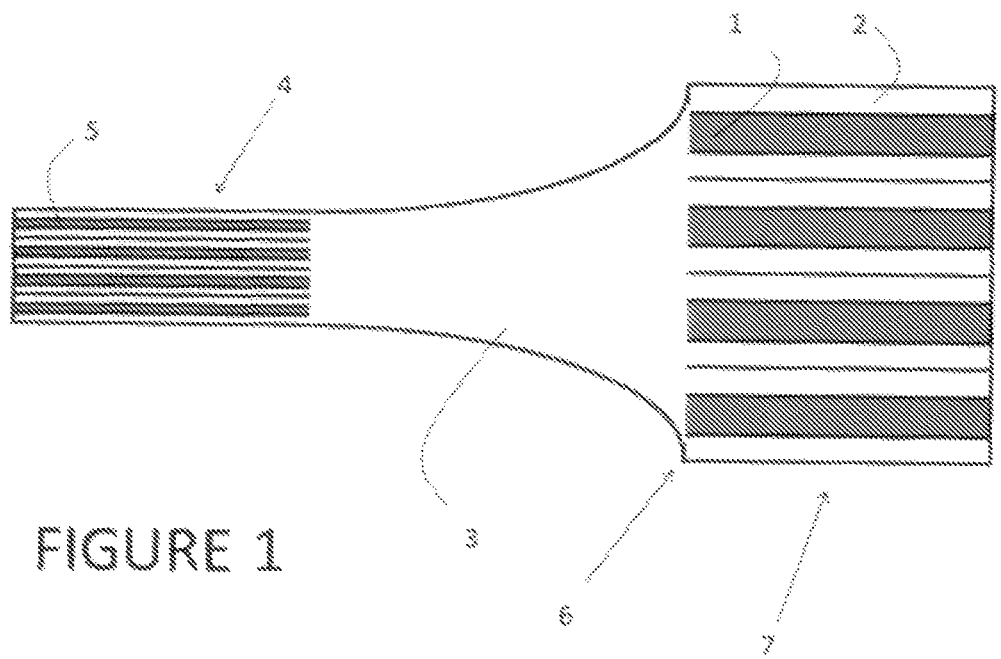
FIG. 1 is an axial section view of the drawing process according to the invention.

The invention relates to a chromatographic method wherein a gaseous, liquid or supercritical fluid mobile phase, which contains substances to be separated, flows through a porous packing which comprises a plurality of capillary channels which extend in the direction of flow of said mobile phase, said packing being manufactured by a method wherein:
a bundle of elementary fibres is assembled, said fibres comprising a core made of a solid, liquid or gaseous material, and a shell made of a drawable material,
said bundle is drawn in order to reduce the diameter of said fibres,
a porous matrix is formed around the core of the drawn fibres, the formation of said porous matrix comprising a transformation of the shell material,
where said porous matrix comprises at least one population of connected pores interconnecting the channels, where the thickness of the porous matrix between two adjacent channels is less than the diameter of the channels, preferably less than half the diameter of the channels, where necessary the core material is removed so as to leave free channels in the porous matrix.

Two general categories of chromatographic method can be distinguished, elution chromatography and affinity chromatography.

The invention advantageously makes use of an elution chromatography method.

Elution chromatography may be undertaken using any known method such as, for example, discontinuous column chromatography, axial or radial continuous annular chromatography, simulated moving bed chromatography.

Advantageously the chromatography method used may be an affinity chromatography method.

Said method preferably comprises at least one of the following characteristics, and yet more preferably a combination of said characteristics:
the pores have a diameter greater than twice the molecular diameter of the substances to be separated,
the thickness of the porous matrix between two adjacent channels is less than the diameter of the channels, and
the mean diameter of the channels is less than 30 μm.

Indeed, in order to exhibit high efficiency a multi-capillary chromatographic packing must exhibit a constant channel diameter within a given channel and between the various channels, a constant wall thickness and a path as linear and rectilinear as possible.

For the same reason the internal walls separating the channels must be porous with respect to the molecules to be separated.

Advantageously the size of the pores of the wall medium is greater than twice the molecular diameter of the species to be separated.

In a condensed phase the steric hindrance to diffusion caused by the pores is calculated using the formula (Deen, 1987):

$$C = K_p * K_r$$

Where $$K_p = (1 - \lambda)^2 \text{ and}$$

$$K_r = 1 - 2,104 * \lambda + 2,089 * \lambda^2 - 0,948 * \lambda^3$$

$$\lambda = \frac{R_h}{r_0}$$

$R_h$ (in μm) is the molecular radius of the molecule of the species to be separated, considered to be spherical, and $r_0$ (in μm) is the radius of the pores.

$K_p$ is a factor which takes into consideration a discrepancy in the concentration at equilibrium between the pores and the infinite medium.

$K_r$ takes into consideration the steric hindrance of the molecules to be separated in the pore volumes.

C is the diffusivity reduction factor in free medium to be applied in order to obtain the diffusivity in the pores.

It can thus be seen that the factor C becomes less than 0.1 for a ratio λ of 0.5, which corresponds to a pore size or diameter of less than twice the diameter of the species molecule to be separated. An order of magnitude of the effective diffusivity is therefore lost, and it becomes prohibitively small, and the efficiency of the separation becomes poor.

The following table calculates the factor C for different molecules and different pore sizes.

| molecule | Rh (nm) | ro(nm) | λ | Kp | Kr | C |
|---|---|---|---|---|---|---|
| organic | 0.15 | 0.3 | 1 | 0.00 | 0.04 | 0.00 |
| organic | 0.15 | 0.6 | 0.5 | 0.25 | 0.35 | 0.09 |
| organic | 0.15 | 1 | 0.3 | 0.49 | 0.53 | 0.26 |
| organic | 0.15 | 2 | 0.15 | 0.72 | 0.73 | 0.53 |
| organic | 0.15 | 4 | 0.075 | 0.86 | 0.85 | 0.73 |
| organic | 0.15 | 6 | 0.05 | 0.90 | 0.90 | 0.81 |
| organic | 0.15 | 10 | 0.03 | 0.94 | 0.94 | 0.88 |
| protein | 1.5 | 6 | 0.5 | 0.25 | 0.35 | 0.09 |
| protein | 1.5 | 10 | 0.3 | 0.49 | 0.53 | 0.26 |
| protein | 1.5 | 30 | 0.1 | 0.81 | 0.81 | 0.66 |
| protein | 1.5 | 100 | 0.03 | 0.94 | 0.94 | 0.88 |
| macromolecule | 5 | 30 | 0.33 | 0.44 | 0.50 | 0.22 |
| macromolecule | 5 | 100 | 0.10 | 0.81 | 0.81 | 0.66 |
| macromolecule | 5 | 300 | 0.03 | 0.93 | 0.93 | 0.87 |

In the gas phase diffusion is hindered when diffusion flow becomes Knudsen flow. This occurs when the mean free path of the molecules becomes of the order of or greater than the pore diameters.

Knudsen diffusivity is expressed as:

$$D_{KA} = \frac{d_{Pore}}{3} * \sqrt{\frac{8 * \kappa * N_{av} * TK}{\Pi * M_A}}$$

When Knudsen diffusivity and molecular diffusivity are in competition, this is expressed as:

$$\frac{1}{D_{Ae}} = \frac{1}{D_{KA}} + \frac{1 - \alpha * y_A}{D_{AB}}$$

Where $$\alpha = 1 + \frac{N_B}{N_A}$$

In general this formula is simplified as:

$$\frac{1}{D_{Ae}} = \frac{1}{D_{KA}} + \frac{1}{D_{AB}}$$

The coefficient C is deduced from this $$C = \frac{D_{Ae}}{D_{AR}} = \frac{D_{KA}}{D_{AB} + D_{KA}}$$

In these formulae the following represent:
$D_{KA}$: Knudsen diffusivity, m²/s
$D_{AB}$: molecular diffusivity, m²/s
$D_{Ae}$: diffusivity in intermediate regime, m²/s
TK: absolute temperature, Kelvin
$M_A$: molar mass of the component A, kg/mole
κ: Boltzmann's constant, MKSA
$N_{av}$: Avogadro's number
$d_{pore}$: pore diameter, m Moreover the smaller the channels, the more efficient and productive the chromatographic packing.

The manufacturing method using drawing meets each point of this set of requirements.

Advantageously the capillary channels exhibit a cross-section which is uniform from one channel to another and over their length.

The variability in the cross-section of the channels is conveniently expressed as a relative standard deviation. This relative standard deviation represents the ratio of the standard deviation of the channels to the mean diameter of the conduits, expressed as a percentage. Advantageously the channels exhibit a mean diameter which is substantially constant from one channel to the next, such that the standard deviation of the diameter for the sample of packing channels does not exceed 10% of the mean diameter, preferably does not exceed 2% of the mean diameter and yet more preferably does not exceed 0.5% of the mean diameter. In this document the term mean of a set of values of a variable X refers to its arithmetic mean E[X]. The standard deviation is defined as the square root of the arithmetic mean of $(X - E[X])^2$. The term distribution in this document refers to a set of values of the variable X.

Advantageously the diameter does not vary by more than 10% over the length of a given channel. Advantageously the diameter preferably does not vary by more than 5% over the length of a given channel. Yet more advantageously the diameter does not vary by more than 2% over the length of a given channel. Yet more preferably the diameter does not vary by more than 0.5% over the length of a given channel.

Advantageously the channels exhibit a mean thickness of the stationary phase which is substantially constant from one channel to the next, such that the standard deviation of the thickness for the sample of packing channels does not exceed 10% of the mean thickness, preferably does not exceed 4% of the mean thickness and yet more preferably does not exceed 1.0% of the mean thickness.

Advantageously the bundle is drawn after it has been inserted into a tube which defines a wall of the final packing. Advantageously this wall is drawn at the same time as the bundle and remains intact and non-porous during the following steps in the method.

This wall may advantageously be made of soda-lime glass, lead glass, pure silica or a polymer.

It will be noted that according to the invention the porosity generated by the capillary channels is regarded as being distinct from that of the material forming the structure and the walls of the material, which is itself porous. The term manufacturing method for a porous material means and relates to creating porosity of the walls.

The term drawing refers to any method which reduces the diameter of the bundle of fibres. This may be hot drawing at a temperature that softens the material of the fibres.

Monofilament fibres or capillary tubes may be made having from 5 to 10 µm in diameter. The manufacture of fine fibres is made difficult, however, by their fragility and difficulties involved in handling them. In order to retain the advantages of handling, manufacture and treatment of macroscopic fibres, the invention proposes making and treating these, then assembling them into bundles which comprise a multiplicity of macroscopic fibres, before reducing their diameter simultaneously by a drawing method.

A large number of microscopic filaments incorporated in a multi-filament bundle of macroscopic size can thus be obtained, and which remains capable of being handled.

The term microscopic filament refers in particular to filaments of diameter less than 10 µm, preferably less than 2 µm, and yet more preferably less than 0.5 µm.

The term macroscopic bundle preferably refers to a bundle of diameter greater than 10 µm, preferably greater than 30 µm, and yet more preferably greater than 100 µm.

An essential factor for differentiating between multi-capillary packings and particulate packings in terms of a chromatographic method is the much lower pressure drop of the latter.

At optimum efficiency this also means that a multi-capillary packing which operates with the same pressure drop as that of a particulate packing exhibits a number of theoretical plates which is 3 to 4 times greater and a productivity (in flow/unit cross-sectional area) which is also 3 to 4 times greater.

These advantages become relevant when the pressure drop of the bed becomes a sensitive Operating parameter and which requires specialist equipment in order to be achieved.

Its lower limit for condensed phase chromatography, and more advantageously liquid phase chromatography, is simply the pressure head of the bed of the stationary phase which itself allows flow under gravity. For a multi-capillary packing this effective limit corresponds to a channel diameter of less than 50 μm for commonly used fluids, preferably less than 3o μm.

Indeed, chromatography is carried out simply in gravity-flow equipment, where the weight of the fluid column on the packing causes it to flow.

The upper limit of the diameter of the capillary channels will be reached when the flow of fluid at the speed at which optimum efficiency of the packing is achieved causes a pressure-drop equal to the weight of the column of fluid, taken over the height of the bed.

It is known that for multi-capillary packing at optimum efficiency:

$$\frac{V_c * d_c}{D_0} = V_R$$

Poiseuille's law is written as $$\Delta P = \frac{32 * \mu * LG * v_c}{d_c^2}$$

The pressure produced by a height of fluid LG is written as $$\Delta P = \rho * g * LG$$

This results in:

$$d_{max} = \sqrt[3]{\frac{32 * \mu * D_o * V_R}{\rho * g}}$$

The table below gives examples of $d_{max}$ for various liquids commonly used in chromatography.

| solvent | μ (Po) | Do (m2/s) | $V_R$ | ρ (kg/m3) | dmax (μm) |
|---|---|---|---|---|---|
| Water | 0.001 | 1E−09 | 5 | 1000 | 25.3869139 |
| Hexane | 0.00031 | 3E−09 | 5 | 659 | 28.4754613 |
| Methanol | 0.00055 | 2E−09 | 5 | 791 | 28.3363475 |
| Chloroform | 0.00057 | 2E−09 | 5 | 1480 | 23.2716977 |

$V_R$ is generally between 2 and 5.

It should be noted that the value $d_{max}$ is always less than 30 μm.

For simplicity the value of 50 μm, more advantageously 30 μm, may be taken as the upper cut-off limit for the diameter of channels at which advantages of multi-capillary chromatography can usefully be obtained.

Drawable fibres comprise a shell which acts as a spacer between the fibres to prevent their cores from touching.

This shell material advantageously can be drawn and its thickness reduced during the fibre-drawing method in the same proportions.

Advantageously, the thickness of the shell material between two adjacent channels is less than the diameter of the channels, and yet more preferably less than half the diameter of the channels.

In a preferential manner for an analytical application, the thickness of the shell material between two adjacent channels is less than a fifth of the diameter of the channels.

Thus the obstacles to diffusion between two channels are minimised in terms of the molecules to be separated and separation can be achieved with high efficiency.

The term thickness of shell material between two adjacent channels means the thickness of said material measured over a chord joining two adjacent channels centre to centre.

The final objective of the manufacturing process is to create channels in a porous matrix. For this objective the filaments must be removed and porosity produced in the shell material.

The manufacturing method is particularly suitable for making channels of very small diameter.

The packings obtained according to this manufacturing method have channels of diameter advantageously less than 30 μm, preferably less than 5 μm and yet more preferably less than 2 μm.

The packings obtained according to this manufacturing method have a length of preferably between a few mm and several tens of cm, or several metres.

It may therefore be imagined that it is difficult to destroy the filaments by leaching them from the ends. One chooses in particular therefore to remove the filaments and create porosity of the walls over the entire length of the final material and advantageously through its periphery. In this case it is advantageous to first of all make or render the material forming the fibre shell porous. In particular, reagents or solvents can thus enter the core of the macroscopic multi-filament bundle by diffusion through the inter-connections in the porosity.

According to one embodiment path of the invention, a gas is used as a core material. In this case the elementary strand will be a capillary tube. Drawing is performed on a bundle of such tubes in order to reduce their diameter without melting their internal channel.

The development of the shell material porosity may advantageously take place by circulating a reagent or a solvent in the free channels obtained.

According to another embodiment path of the invention, an acid-soluble glass (generally type EG1 or EG3) is used as a core material and a borosilicate glass capable of undergoing spinodal transformation is used as a shell material. However, the high coefficient de thermal expansion of glass such as EG1 ($91.2 \times 10^{-6}$) compared with that of a borosilicate glass ($33 \times 10^{-6}$) limits such a method to channels whose size is small relative to the thickness of the shell materials, for reasons of mechanical solidity (breakage of assemblies of the two glasses during heating). In practice the thickness of porous silica between two channels is limited to being greater than twice the diameter of the conduits.

According to another embodiment path of the invention a material that fuses at a temperature which is lower than a temperature which causes deformation of the bundle, such as the creep temperature of glass or a polymer, is used a core material.

Advantageously the core material of the fibres is a drawable material such as a glass, a polymer or a metal.

This stabilises the volume inside the channels and the risks of melting and blockage are limited.

In particular core materials that effectively wet the shell material are used in preference.

In the instance where the shell material is glass, then indium or an alloy containing indium is preferably used as a core material.

Advantageously the core material is liquid at the drawing temperature of the bundle and solid at ambient temperature or at any temperature selected for the method.

The solid core is retained at both ends of the bundle during drawing by keeping them at a suitable temperature, so that the volume offered to the molten core material is precisely controlled and is the same in each capillary. These two ends act as a plug.

An important use of these packings is in carrying out chromatographic separations of molecules and of liquids intended for human consumption. These are, in particular, potable water, medications, food additives etc.

In such cases all the elements and components of the packing must be compatible with strict health constraints. In particular it is important to avoid any contamination of the packing by toxic residues from the manufacturing process, and to avoid the use of toxic manufacturing intermediates as much as possible.

The residues from these materials may persist in the packing and contaminate the species that will be processed there, or spread into the environment after it is destroyed.

These low melting-point metals essentially include lead, tin, bismuth, gallium, mercury, silver, cadmium and indium. Since lead, cadmium and mercury are toxic heavy metals which are harmful to human and animal health and to the environment, alloys which do not contain these elements, and which are based on tin, bismuth, indium, gallium, silver or any combination of these, or with other less fusible metals, are chosen in preference.

In particular this may be a mixture of bismuth and tin. There is, in particular, a eutectic mixture of these metals which comprises 58% by weight of bismuth, 42% by weight of tin and which melts at 138° C.

Alternatively these may be indium-based metal alloys. Amongst these indium alloys, an alloy of 52% indium and 48% tin by weight and which melts at 118° C. is preferably used. An alloy of 32.5% bismuth, 51% indium and 16.5% tin by weight and which melts at 60° C. may also be used.

Advantageously the solid and the liquid will have the same density during fusion.

Fusion of bismuth is accompanied by a reduction in volume. On the other hand, the fusion of the lithium and other metals are generally accompanied by an expansion in volume.

Variations in volume on fusion may therefore be avoided, or any desired variation obtained by mixing bismuth, indium and if necessary other metals.

The core material fused at a temperature below the creep temperature or degradation temperature of the shell material is easily removed by running it out of the bundle and of the shell material matrix after drawing of the bundle.

The development of the porosity of the shell material may advantageously take place after this step for removal of the molten core. In particular a reagent or solvent may be circulated in the channels left free by the removal of the core material.

Of the fusible materials used to form the core material, waxes, paraffins, polymers which melt into liquids of reliable viscosity such as low molecular weight PolyEthyleneGlycols, polylactic acid etc. may be noted in particular.

Carnuba wax, beeswax, etc. may be noted amongst the waxes.

The core material may be eliminated by thermolysis.

According to another embodiment path for the invention, a material which is vitreous, viscous or paste-like at the temperature which causes deformation of the bundle and allows it to be drawn, is used as a core material. This may be, in particular, a high polymer or a glass.

Advantageously the shell material is made of a drawable material such as a glass.

Advantageously the shell material will act as a support or will contain porous silica of specific surface area greater than 70 m2/g, and preferably greater than 140 m2/g.

Advantageously this porous silica will have a surface area analogous to that of a silica gel which can be used in chromatography.

Advantageously the shell material has a pore volume greater than 30% of its total volume, preferably greater than 40% of its total volume and yet more preferably greater than 50% of its total measured volume excluding the volume of the channels.

The term measured excluding the channel volume means the ratio of the porous volume of the porous walls of the packing separating the channels to the weight of said walls, not taking the volume of the capillary channels in the porosity into consideration.

Advantageously the porous material contains a charge of nanometric particles which carry out the chromatographic function in an inert or non-inert binder.

The porosity can be charged with a reinforcement material such as a solid charge whose particles are sufficiently small to enter the porosity, or by a gel sol method carried out in the pores, or by the two processes together.

The term sufficiently small particle size means in particular particle sizes less than the wall thickness of the final material.

Alternatively the solid charge may be occluded in the secondary material drawn and rendered accessible after its porosity is generated.

Silica gels are amongst the solid charges that may be cited.

According to one embodiment path the shell material is glass which is made porous.

Porosity can be created in particular within borosilicate glass. This porosity is developed in two steps:
  hot tempering is performed at a temperature of the glass of between, preferably, 550 and 600° C. for a period of several hours. The glass material separates into two phases: one phase which is rich in silica which provides a continuum and a sodium- and boron oxide-rich phase which ensures a second connectivity;
  hot aqueous acid leaching is performed on the tempered glass, which has the effect of selectively dissolving the boron oxide-rich phase and of creating porosity.

Thus fibres can be drawn whose shell material is made of borosilicate glass, which is later made porous by carrying out tempering and acid leaching on the glass.

In a particularly simple manner this may be carried out starting with capillary tubes made of borosilicate glass assembled into bundles and drawn.

These tubes are advantageously filled with a fusible metal before drawing in order to improve this process.

Preferentially the set of operating conditions is chosen such that the acid leaching is carried out with minimum change in the volume of glass.

The acid leaching of borosilicate glass which has undergone spinodal decomposition is achieved with a positive or negative change in volume.

In order to avoid mechanical stress being generated in the glass and which may lead to breakage, conditions are chosen which ensure minimum volume change during this phase.

Preferably a borosilicate glass made up of three components is chosen whose molar % values vary in the following range:

SiO2 between 63 and 75%
Na2O or K2O between 5 and 8%
B2O3 between 20 and 35%

Reference may be advantageously made to the following for the definition of this range:

Phase Separation In Glass, O. V. MAZURIN and E. A. PORAI-KOSHIT, 1984, North Holland publisher, p. 310.

Reference should also be made to this work to help define experimental conditions which can be used to govern the pore size of porous glass.

According to another embodiment path the shell materials may also be made of a drawable thermoplastic polymer or a mixture of these.

The following artificial and synthetic polymers can be cited:

Cellulose derivatives: cellulose acetate (CA)
Vinyl polymers: poly(vinyl chloride) (PVC); chlorinated poly(vinyl chloride) (PVC-C);
poly(vinylacetate) (PVAC); polyvinyl alcohol (PVAL)
Styrene polymers: polystyrene (PS) acrylonitrile styrene acrylate (ASA)
Saturated polyesters: poly(ethylene terephthalate) (PET); poly(butylene terephthalate) (PBT); poly(ethylene naphthalate) (PEN) or unsaturated (UP)
Polyamides (PA): PA 6, PA 6-6, PA 11, PA 12, PA 4-6, etc.
Polyurethanes (PUR) saturated or cross-linked
Polycarbonate (PC)
Acrylics: poly(methyl methacrylate) (PMMA); polyacrylonitrile (PAN)
Polyacetals: polyoxymethylene (POM)
Silicones (SI)
Polyimides (PI)
Halogenated
  Chlorinated: poly(vinyl chloride) (PVC); chlorinated poly(vinyl chloride) (PVC-C); poly(vinylidene chloride) (PVDC)
  Fluorinated: polytetrafluoroethylene (PTFE), more commonly known under the name of Teflon™ poly vinyl fluoride (PVF); poly vinylidene fluoride (PVDF); ethylene tetrafluoroethylene (ETFE); perfluoroalkoxy (PFA)
Polydimethylsiloxane (PDMS)
Epoxides (EP)
Thermostable polymers: polyetheretherketone (PEEK); liquid crystal polymer (LCP)

The shell material advantageously contains a binder and a blowing agent. The following inert polymers can be cited as binders; polyolefins (polyethylene, polypropylene etc.), PVDF, the Teflon family of materials (DuPont du Nemours trademark) and in particular amorphous Teflons (DuPont's Teflon AF) nylon, PMMA etc.

Light or heavy organic solvents, polymers, oligomers of suitable molecular weight etc. made be cited as blowing agent materials.

The binder and blowing agent advantageously form two connecting networks in the material.

In order to create porosity, the blowing agent may be dissolved in a suitable solvent, by chemical reaction of the blowing agent, for example by hydrolysis, by thermolysis etc.

The porosity can be charged with a reinforcement material such as a solid charge whose particles are sufficiently small to enter the porosity, or by a sol-gel method carried out in the pores, or by the two processes together.

The term sufficiently small particle size means in particular particle sizes less than the wall thickness of the final material.

The binder material may advantageously itself be removed so as to leave only reinforcement material around the channels.

Alternatively the solid charge may be occluded in the drawn shell material and rendered accessible after said porosity is generated.

The following solid charges in particular may be listed: silica gels, polymer gels or any charge which may have chromatographic activity.

Advantageously the porous material contains a copolymer of styrene and of divinyl benzene.

The secondary shell material is advantageously a polymer gel of the type described in U.S. Pat. No. 4,007,138, deposited by extrusion on the fibre that is to be drawn, before drawing, then exchange of the heavy blowing agent solvent (see also example 1 from the patent referred to). In this case the fibre may be polymeric and in particular made of a polymer that can be hydrolysed.

In general terms, the polymers that undergo hydrolysis and which can be used to create capillary channels by hydrolysis include, amongst others, polyesters derived from glycolic acid, from lactic acid, from cellulose and in particular polyglycolic acid or its copolymers with lactic acid, with ε-caprolactone or with trimethylene carbonate. A polymer is preferably chosen for which hydrolysis is rapid and leaves no residue at a temperature of 80 to 100° C. The hydrolysis may be accelerated by acid or base catalysis.

In the present document the molecular diameter is calculated in two ways, depending on the molecular weight and the characteristics of the substance under consideration.

For substances which exhibit a gas phase or for which the values of the critical point can be calculated, the covolume, term b of Van de Waals equation, is used divided by 4 and by Avogadro's number, and the diameter of a sphere of equivalent volume is calculated. It is known that the covolume b is equal to four times the molecular volume. The covolume can be readily obtained from the critical coordinates of the body under consideration.

For macromolecules, biological molecules (proteins etc.) and molecules without a gas phase, the hydrodynamic diameter measured by dynamic diffusion of light is used.

In the present document the mean diameter and standard deviation of the diameter of the channels in calculated using image analysis over a section of the packing parallel to the channels.

When the channels exhibit variability or standard deviation over their diameter which is greater along the packing than their standard deviation measured over a section of the packing perpendicular to the channels, the mean diameter is measured over a multiplicity of sections made along the packing, in order to obtain the volume of each channel and, knowing this, its mean diameter on the basis of a constant length equal to that of the packing.

In the present document the mean thickness and standard deviation of the thickness of the walls of the channels is calculated using image analysis obtained by scanning electron microscopy over a section of the packing parallel to the channels.

When the channels exhibit variability or standard deviation over their wall thickness which is greater along the packing than their standard deviation measured over a section of the packing perpendicular to the channels, the mean wall thickness is measured over a multiplicity, of sections made along the packing, in order to obtain the volume of each wall and, knowing this, its mean thickness on the basis of a constant length equal to that of the packing.

The pore sizes mentioned in the present document are measured according to two different techniques, depending on the nature of the materials being tested: when it is a mineral material, in particular silica, the technique involved is mercury porosimetry for macro- and mesoporosity values and nitrogen adsorption for microporosities. When polymer materials or materials based on mineral matrices covered with organic gels are involved, mercury porosimetry is used for the macroporosity and nitrogen adsorption porosimetry for mesoporosity and microporosity.

FIG. 1 shows a drawing process according to the invention. A bundle 7 of fibres 1 comprising a shell material 2 is drawn from a region 3 so as to obtain a bundle 4 of smaller diameter comprised of finer fibres 5. The initial bundle may be compacted in order to eliminate the free space between the fibres.

The bundle may be comprised of hexagonal fibres 1, 2 stacked so that they are optimally compact.

Drawing may be achieved by heating the region 6 of the bundle 7 above its melting or softening point or melting point of the materials of fibre 1 comprising the shell 2.

A continuous method is carried out by introducing the bundles 7 gradually moving from right to left at a constant speed, whilst drawing the bundle from the region 6 which is therefore being continually fed. The heating of the region 6 and the feed speed of the bundle 7 are selected so as to only melt the core material at the drawn end of the bundle and to ensure it remains solid upstream of this point. Drawing can be carried out at a constant speed greater than the feed speed of the bundle 7, and the portion 4 of the drawn fibre is continually cooled to below the melting point of the core material. Thus an area of invariable volume is maintained offered to the liquid core in zone 3 during drawing, with no possibility of upstream or downstream leaks occurring. This results in a high degree of regularity in the drawing process and in the product obtained.

Alternatively (not shown) the fibres can be drawn, cut into length and then assembled into a bundle, preferably by inserting them in a tube whose wall is non-porous.

Figure 2:
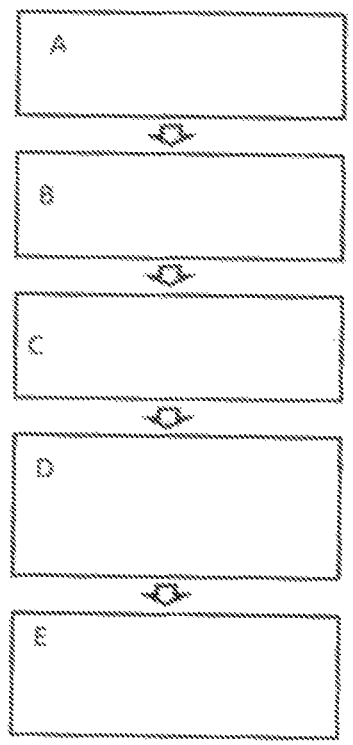
FIG. 2 is a diagram which shows the steps in a method according to the invention.

FIG. 2 schematically shows the remaining steps in a method according to the invention. Step A consists of making a bundle of coated fibres. Step B consists of inserting this bundle into a tube. Step A and step B can be carried out simultaneously. Step C involves drawing the assembly formed by the fibres and the tube in order to reduce its diameter. Step D consists of removing the core material of the fibres, made, for example, of a fusible metal. The final step E involves developing the porosity in the walls of the channels.

Figure 3:
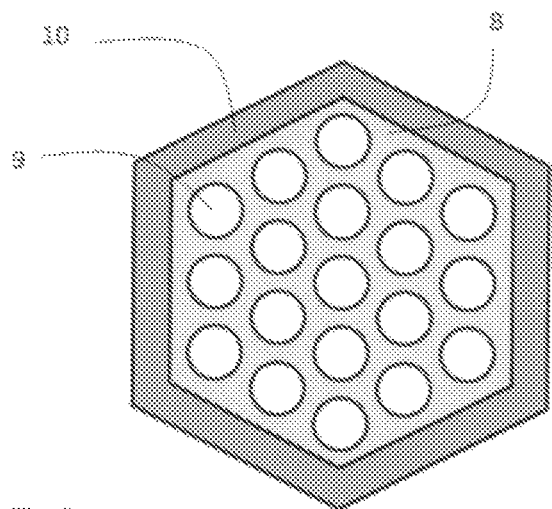
FIG. 3 is a radial section view of a product obtained by a method according to the invention.

FIG. 3 is a section view of the final drawn bundle obtained by a method according to the invention. This contains free channels 9 in a porous matrix 8 inserted in a tube 10 which exhibits a solid non-porous wall. The channels have been produced by removal of the core of the drawn fibres 1. The bundle may have a hexagonal contour and may itself by stacked in order to make packings of greater dimensions.

Figure 4:
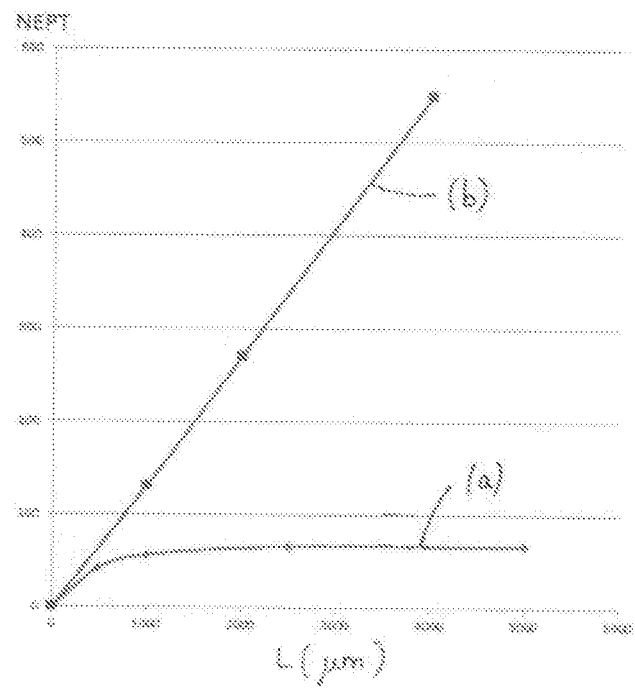
FIG. 4 shows the relationship between NEPT (number of theoretical plates) and the length of packing for porous multi-capillary monoliths and non-porous multi-capillary monoliths.

FIG. 4 shows a first result of simulations. The graphs are drawn with the length L of a chromatography column as the abscissa and the number of theoretical plates NTP as the ordinate.

Graph (a) shows packing made of channels whose diameters are randomly variable in accordance with a Gaussian statistical distribution with a mean of 10 µm, with a standard deviation of 0.5 µm, for non-porous walls.

Graph (b) shows the same packing with porous walls which exhibit 55% porous volume, a wall thickness of 2 µm and a pore size ten times greater than the molecular diameter of the species to be separated.

Graph (a) which levels out at a theoretical plate number which is independent of the length, represents the behaviour of a bundle of solid-wall independent capillary channels. The diameter of the channels varies according to a normal statistical distribution.

Line (b) shows the behaviour of the same columns with porous walls between the capillary channels, allowing molecules of the substances that are to be separated to diffuse between the channels. The efficiency increases linearly in proportion with the length. This shows that diffusion evens out the differences in behaviour between the channels.

Figure 5:
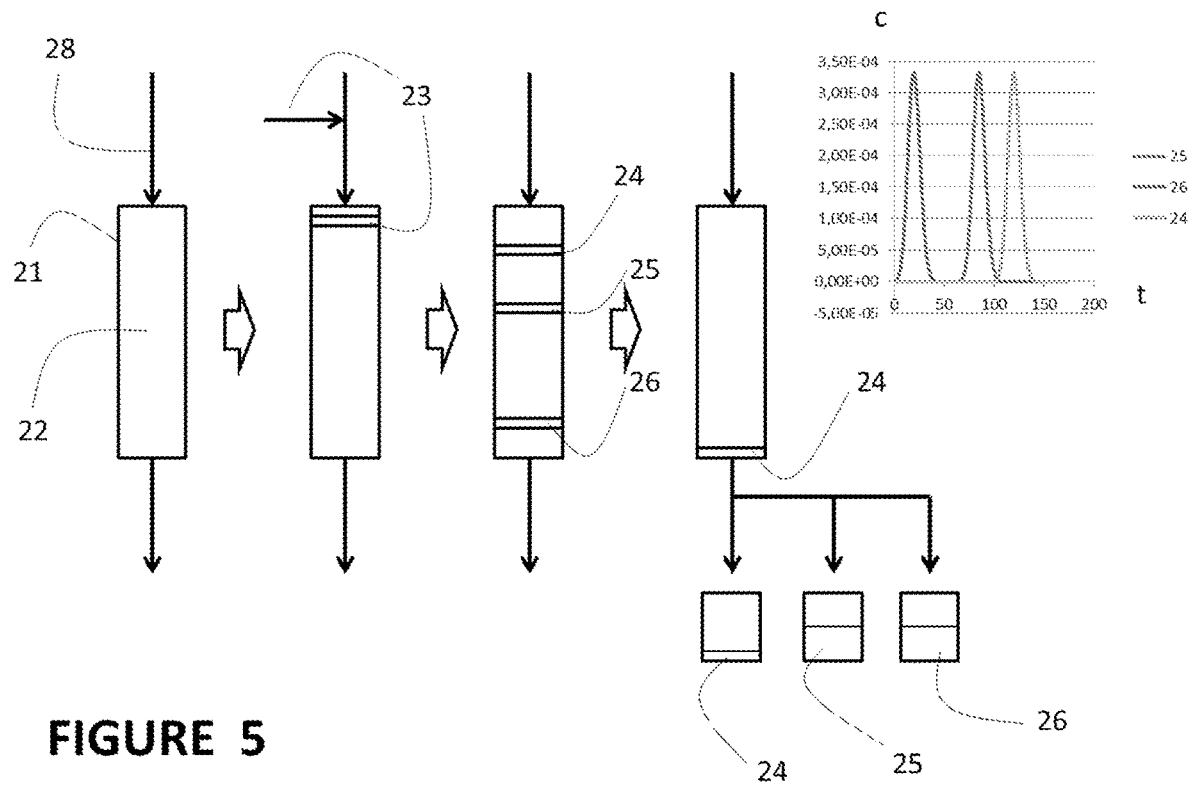
FIGS. 5 and 6 show details of two embodiment options of a chromatographic method.

FIG. 5 describes an elution chromatography method. According to this method a continuous flow of mobile phase 28 whose composition and temperature may vary over time, passes through the chromatography column 21 filled with a stationary phase 22. A charge volume to be separated 23 is introduced into the supply flow. Due to the antagonistic effect of the reversible retention of the chemical species by the stationary phase and of elution or entrainment by the mobile phase, the species migrate at different speed along the column 21 and separate into elution bands or peaks 24, 25, 26 etc.

The separated species are isolated by fractionation of the flow emerging from the column, so as to collect each band at the time it emerges from the column in the elution solvent.

This fractionation may be time-based in the case of a discontinuous method or angular in the case of a continuous angular device. It may involve the separation of a head fraction and of a tail fraction for a simulated moving bed device.

The chromatogram shows the concentration peaks of species 24, 25, 26 at the outlet of the column as a function of time.

Figure 6:
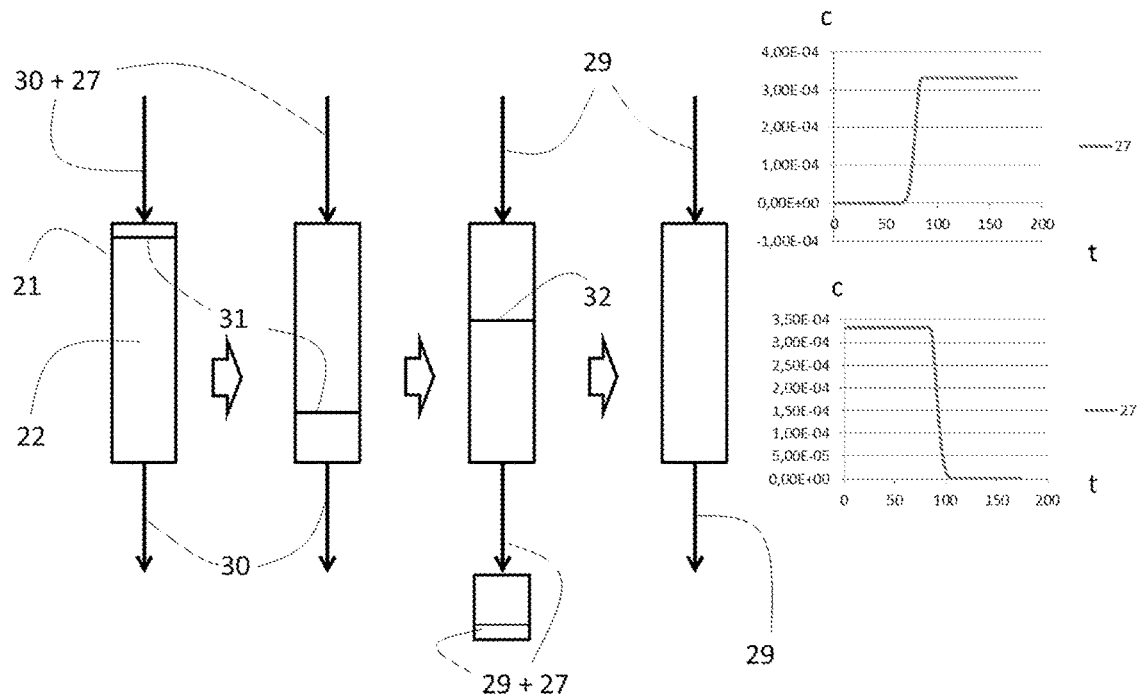

FIG. 6 describes an affinity chromatography method used to separate biomolecules. A continuous flow of solvent 30 containing the biomolecule to be separated 27 is fed into the chromatography column 21 filled with a stationary phase 22 which exhibits a strong affinity for the biomolecule to be separated. Due to the effect of this strong affinity the molecule is fixed to the stationary phase continually until the latter is saturated. This fixing is more-or-less irreversible under the conditions of this first phase. The front 31 showing concentration of 27 progressing is in this case a step progressing towards the outlet. The column is saturated when the concentration of 27 in the solvent becomes significant at the outlet of the column.

During a second phase, the properties (pH, ionic strength, etc.) or the nature of the elution solvent 29 is changed in order to reduce or eliminate the affinity of the biomolecule 27 for the stationary phase 22 and to make the biomolecule soluble in the solvent 29. The biomolecule 27 is eluted in the solvent 29 emerging from the column 21 until the amount present in the latter is exhausted. The column 21 is thus regenerated and ready for a new cycle.

The chromatograms show the concentration profiles of the species 27 at the column outlet as a function of time, during the fixing and then elution phases.

The pores size of the continuous medium is advantageously greater than twice the molecular diameter of the species to be separated.

This very important characteristic means that the packing can be used under optimum efficiency conditions. This is shown in FIGS. 7 and 8.

Figure 7:
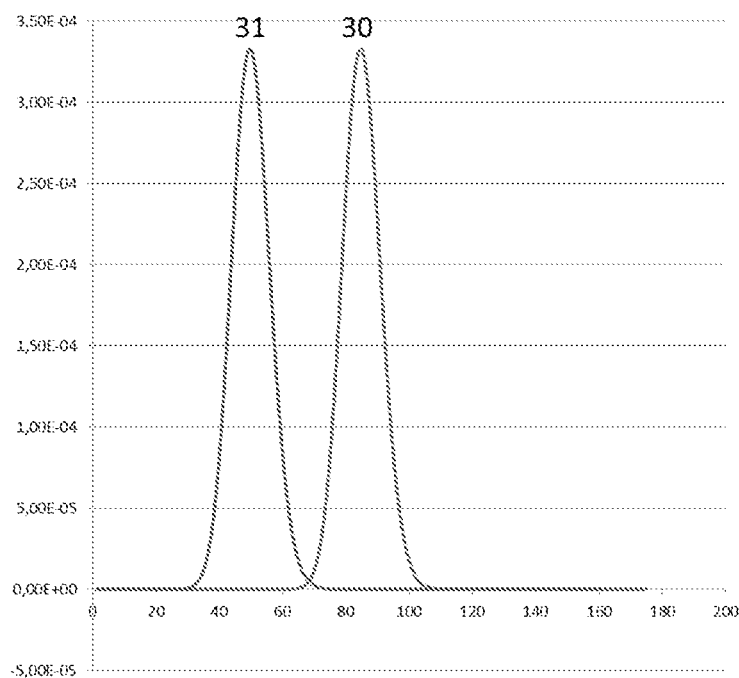
FIG. 7 schematically shows a computer simulation of the separation of two chemical species on a porous wall multi-capillary packing in which the diameter of the connecting pores is greater than twice the molecular diameter of these species.
Figure 8:
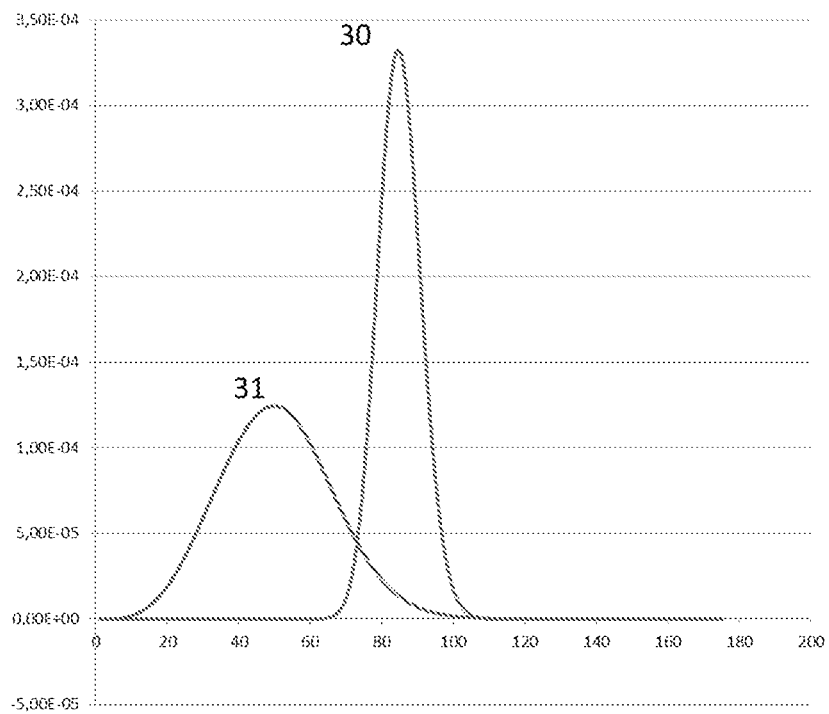
FIG. 8 schematically shows a computer simulation of the separation of the same chemical species on a packing which exhibits the same dimensional characteristics, but whose connecting pore diameter is greater than twice the molecular diameter of one of these species.

FIG. 7 schematically shows a computer simulation of the separation of two chemical species on a porous wall multi-capillary packing in which the diameter of the connecting pores is greater than twice the molecular diameter of these species. The diameters of the capillary channels of the packing exhibit a statistical variability. These diameters are distributed over a Gaussian curve whose standard deviation is equal to 5% of their mean diameter.

These species are, for example, a mineral salt such as sodium chloride 30 and a peptide 31 dissolved in water.

Good separation of the two elution peaks is observed, allowing the two species to be separated.

FIG. 8 schematically shows a computer simulation of the separation of the same chemical species on a packing which exhibits the same dimensional characteristics, but whose connecting pore diameter is greater than twice the molecular diameter of the species 30 and is less than twice the molecular diameter of the species 31.

It can be seen that the two peaks overlap and no longer allow efficient and complete separation of the two species. This effect is due to the fact that the porous nature of the gel allows equilibration of the concentrations between the channels by molecular diffusion in the case of species 30, but not in the case of species 31. This means that the species 31 is subject to significant additional spreading due to the irregular nature of the diameters of the capillary channels which is no longer compensated for by molecular diffusion between the adjacent channels.

Consequently, in order to optimise the level of separation performance in the presence of two (or more) species which exhibit consecutive peaks, the connecting pore sizes must be made to be greater than twice the molecular diameter of each said species.

Figure 9:
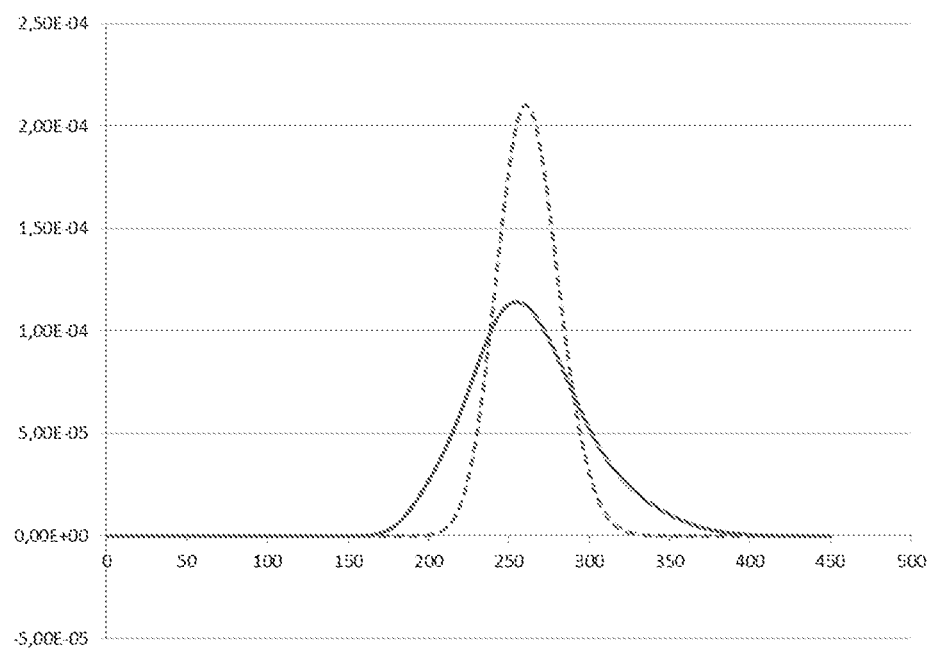
FIG. 9 shows the chromatographic responses of a given column in a case where the eluted molecule has a molecular diameter less than twice the diameter of the pores, allowing diffusion between adjacent channels (broken line curve), and in a case where its molecular diameter, greater than twice the pore diameter, does not allow this (unbroken line curve), the column contains channels whose diameters are distributed randomly in accordance with a Gaussian distribution whose standard deviation represents 5% of the mean diameter of the channels.

In the case of FIG. 9, the column contains channels whose diameters are distributed randomly in accordance with a Gaussian distribution whose standard deviation corresponds to 5% of the mean diameter of the channels.

It can be seen that when diffusion takes place (broken line curve) the number of theoretical plates for the column is 178. When diffusion is prevented (unbroken line curve) the number of theoretical plates for the column is now only 50, which shows that the level of column performance is considerable lower.

Example 1

A bundle of 100 capillary tubes of length 200 mm made of borosilicate glass of 0.20 mm external diameter and 0.1 mm internal diameter are stacked in accordance with a square grid into a bundle of sides 2 m with a square cross section.

The borosilicate glass has a molar composition of 63% of $SiO_2$, 7% of $Na_2O$, 30% of $B_2O_3$.

One end of this bundle is heated to 750° C. and the bundle is drawn, with a linear elongation factor of 30 times.

200 mm of the resulting filament is tempered at 570° C. for four hours then slowly cooled.

2N hydrochloric acid is then passed through the channels in order to dissolve the soluble phase and free the porosity.

The packing is then washed with distilled water and dried.

Example 2

A bundle of 91 capillary tubes of length 200 mm made of borosilicate glass of 0.20 mm external diameter and 0.1 mm internal diameter are filled with liquid indium at 180° C. then cooled to ambient temperature.

The borosilicate glass has a molar composition of 63% of $SiO_2$, 7% of $Na_2O$, 30% of $B_2O_3$.

The tubes are stacked in a hexagonal tube of soda-lime-silica glass of internal dimension 1.2 mm and 2.5 mm external dimension. One end of this bundle is heated to 750° C. and the rod is drawn, with a linear elongation factor of 30 times.

200 mm of the resulting filament is tempered at 570° C. for four hours then slowly cooled.

The filament is then heated to 180° C. and the liquid indium is eliminated under pressure. 2N hydrochloric acid is then passed through the channels in order to dissolve the soluble phase and free the porosity.

The packing is then washed with distilled water and dried.

Example 3

2 parts polypropylene with a MI of 0.8 g/10 min and one-and-a-half parts of tetrahydronaphthalene are mixed to form a homogeneous blend at a temperature of about 160° C. and after cooling at 140° C. are mixed with one part of styrene containing 8% by weight of dinvinylbenzene. 0.5% by weight of p-methoxyphenol is added to the blend as a polymerisation inhibitor and 0.1% by weight of di-t-butyl hydroperoxide as a polymerisation initiator. Blending is continued for 5 min. The mixture is then polymerised in a reactor, under pressure, at 180° C. for 8 hours.

Filaments of Caprosyn (Tyco Healthcare brand) are melted and the liquid is co-extruded at 180° C. with the mixture from the previous operations in order to obtain a strand of about 100 μm diameter comprising a 50 μm core of caprosyn.

The filament is wound in a preform of square cross-section of 2 mm×2 mm over a 200 mm length, arranged in a steel plate 200 mm long and 5 mm thick so as to fill this channel in an ordered manner. The winding is compacted into the channel by a press in order to make a compact rod of millimetre dimensions.

This bar is extracted from its metallic housing and drawn by continually heating one of its ends at 160° C. and by drawing it to an external diameter of about 100 μm.

200 mm of the multi-filament thus obtained is fixed into a groove of the same size (100 μm) made in a plate of 18-8 stainless steel.

The steel plate bearing the multi-filament is subjected to a bath of boiling methanol in order to extract the tetrahydronaphthalene and to free the porosity around the caprosyn filaments.

The multi-filament is then exposed to a bath of N caustic soda for 24 hours at 100° C. in order to release the channels.

The resulting material is washed with distilled water so as to eliminate the acid residues.

REFERENCES

WO 2011/114017
U.S. Pat. No. 5,234,594

Phase Separation In Glass, O. V. MAZURIN et E. A. PORAI-KOSHIT, 1984, North Holland publisher, p. 310
U.S. Pat. No. 4,007,138

The invention claimed is:

1. A chromatography method wherein a gaseous, liquid or supercritical fluid mobile phase containing substances to be separated, flows through a porous packing which comprises a plurality of capillary channels which extend in the direction of flow of the mobile phase, the method comprising:

(a) manufacturing the porous packing by the following process:

assembling a bundle of elementary fibres, said fibres comprising a core made of a metal and a shell made of borosilicate glass, drawing said bundle in order to reduce the diameter of the fibres, the metal being fused, transforming the borosilicate glass by spinodal decomposition into a porous matrix around the core of the drawn fibres, said porous matrix comprising at least one population of connected pores interconnecting the channels, wherein the thickness of the porous matrix between two adjacent channels is less than the diameter of the channels, removing the metal so as to leave free channels in the porous matrix, (b) flowing the mobile phase containing the substances to be separated though the channels of the porous packing, wherein at least part of the substances to be separated diffuse between adjacent channels through the at least one population of connected pores.

2. The method according to claim 1, wherein the pores have a diameter greater than twice the molecular diameter of the substances to be separated.

3. The method according to claim 1, wherein the mean diameter of the channels is less than 30 μm.

4. The method according to claim 1, wherein the mobile phase is a gas phase and the population of connected pores interconnecting the channels has a mean diameter greater than the mean free path of the substances to be separated in the mobile phase.

5. The method according to claim 1, wherein the bundle is drawn after it has been inserted into a tube made of a non-porous material which can be drawn simultaneously with said bundle and which defines a wall of the porous packing, wherein said wall remains non-porous after the transformation of the shell material.

6. The method according to claim 1, wherein the porous packing has a pore volume greater than 30% of its total measured volume excluding the volume of the channels.

7. A method for manufacturing multi-capillary porous packing for implementing a chromatographic method, comprising at least the following steps:

providing at least one fibre comprising a shell made of borosilicate glass, that can be drawn when exposed to heat and a core made of a solid metal filling said shell, continuously feeding in the at least one fibre fed into a drawing device, in the drawing device, heating a region of the at least one fibre so as to make the borosilicate glass drawable in this region and to melt the metal in said region, in the drawing device, maintaining the metal solid in a portion of the at least one fibre upstream of said region, and in the drawing device, drawing a portion of the at least one fibre downstream of said region and cooling down said portion to below the fusion temperature of the core material, transforming the borosilicate glass by spinodal decomposition into a porous matrix, and removing the metal so as to form capillary channels extending through said porous matrix, wherein the porous matrix comprises at least one population of connected pores interconnecting the channels and the thickness of the porous matrix between two adjacent channels is less than the diameter of the channels.

8. The method according to claim 7 wherein, before or after the drawing step, a plurality of fibres each comprising a shell made of borosilicate glass that can be drawn when exposed to heat and a core made of metal which fills said shell, are assembled so as to form a bundle.

9. The method according to claim 8 wherein the bundle of fibres is inserted into a tube which has a non-porous wall.

10. The method of claim 1, wherein the thickness of the porous matrix between two adjacent channels is less than half the diameter of the channels.

11. The method of claim 3, wherein the mean diameter of the channels is less than 10 μm.

12. The method of claim 6, wherein the porous packing has a pore volume greater than 50% of its total measured volume excluding the volume of the channels.

13. The method of claim 7, wherein the thickness of the porous matrix between two adjacent channels is less than half the diameter of the channels.

14. A chromatography method wherein a gaseous, liquid or supercritical fluid mobile phase containing substances to be separated, flows through a porous packing which comprises a plurality of capillary channels which extend in the direction of flow of the mobile phase, the method comprising:

(a) manufacturing the porous packing by the following process:

assembling a bundle of elementary fibres, said fibres comprising a core made of a solid, liquid or gaseous material, and a shell made of a drawable thermoplastic polymer, drawing said bundle in order to reduce the diameter of the fibres, creating porosity in the thermoplastic polymer to form a porous matrix around the core of the drawn fibres, said porous matrix comprising at least one population of connected pores interconnecting the channels, wherein the thickness of the porous matrix between two adjacent channels is less than the diameter of the channels, removing, where necessary, the core material so as to leave free channels in the porous matrix, (b) flowing the mobile phase containing the substances to be separated though the channels of the porous packing, wherein at least part of the substances to be separated diffuse between adjacent channels through the at least one population of connected pores.

15. The method according to claim 14, wherein the pores have a diameter greater than twice the molecular diameter of the substances to be separated.

16. The method according to claim 14, wherein the mean diameter of the channels is less than 30 μm.

17. The method of claim 14, wherein the mobile phase is a gas phase and the population of connected pores interconnecting the channels has a mean diameter greater than the mean free path of the substances to be separated in the mobile phase.

18. The method of claim 14, wherein the porous packing has a pore volume greater than 30% of its total measured volume excluding the volume of the channels.

19. The method of claim 14, wherein the thermoplastic polymer comprises a blowing agent and a binder, and creating the porosity in the thermoplastic polymer comprises dissolution, hydrolysis, or thermolysis of the blowing agent.

20. A method for manufacturing multi-capillary porous packing for implementing a chromatographic method, comprising at least the following steps:
provSiding at least one fibre comprising a shell made of a thermoplastic polymer that can be drawn when exposed to heat and a core made of a solid material filling said shell,
continuously feeding the at least one fibre fed into a drawing device,
in the drawing device, heating a region of the at least one fibre so as to make the thermoplastic polymer drawable in this region and to melt the core material in said region,
in the drawing device, maintaining the core material solid in a portion of the at fibre upstream of said region, and
in the drawing device, drawing a portion of the at least one fibre downstream of said region and cooling down said portion to below the fusion temperature of the core material,
creating porosity in the thermoplastic polymer to form a porous matrix, and
removing the core material so as to form capillary channels extending through said porous matrix, wherein the porous matrix comprises at least one population of connected pores interconnecting the channels and the thickness of the porous matrix between two adjacent channels is less than the diameter of the channels.

21. The method according to claim 20 wherein, before or after the drawing step, a plurality of fibres each comprising a shell made of thermoplastic polymer that can be drawn when exposed to heat and a core made of solid material which fills said shell, are assembled so as to form a bundle.

22. The method according to claim 21 wherein the bundle of fibres is inserted into a tube which has a non-porous wall.

23. The method of claim 20, wherein the thickness of the porous matrix between two adjacent channels is less than half the diameter of the channels.

24. The method of claim 20, wherein the mean diameter of the channels is less than 10 µm.

25. The method of claim 20, wherein the porous packing has a pore volume greater than 50% of its total measured volume excluding the volume of the channels.

26. The method of claim 20, wherein the thickness of the porous matrix between two adjacent channels is less than half the diameter of the channels.

27. The method of claim 20, wherein the thermoplastic polymer comprises a blowing agent and a binder, and creating the porosity in the thermoplastic polymer comprises dissolution, hydrolysis, or thermolysis of the blowing agent.

28. A method for manufacturing multi-capillary porous packing for implementing a chromatographic method, comprising at least the following steps:
providing at least one fibre comprising a shell made of borosilicate glass, that can be drawn when exposed to heat, and a gaseous core,
continuously feeding the at least one fibre fed into a drawing device,
in the drawing device, heating a region of the at least one fibre so as to make the borosilicate glass drawable in this region,
in the drawing device, drawing a portion of the at least one fibre downstream of said region and cooling down said portion to below the fusion temperature of the core material,
transforming the borosilicate glass by spinodal decomposition into a porous matrix, and
forming capillary channels extending through said porous matrix, wherein the porous matrix comprises at least one population of connected pores interconnecting the channels and the thickness of the porous matrix between two adjacent channels is less than the diameter of the channels.

29. The method according to claim 28 wherein, before or after the drawing step, a plurality of fibres each comprising a shell made of borosilicate glass that can be drawn when exposed to heat and a gaseous core are assembled so as to form a bundle.

30. The method according to claim 29 wherein the bundle of fibres is inserted into a tube which has a non-porous wall.

31. The method of claim 28, wherein the thickness of the porous matrix between two adjacent channels is less than half the diameter of the channels.

32. The method of claim 28, wherein the mean diameter of the channels is less than 10 µm.

33. The method of claim 28, wherein the porous packing has a pore volume greater than 50% of its total measured volume excluding the volume of the channels.

34. The method of claim 28, wherein the thickness of the porous matrix between two adjacent channels is less than half the diameter of the channels.

* * * * *